(12) United States Patent
Shooshtari et al.

(10) Patent No.: US 8,920,595 B2
(45) Date of Patent: Dec. 30, 2014

(54) FORMALDEHYDE FREE BINDER COMPOSITIONS FOR FIBROUS MATERIALS

(71) Applicant: Johns Manville, Denver, CO (US)

(72) Inventors: Kiarash Alavi Shooshtari, Littleton, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 13/734,666

(22) Filed: Jan. 4, 2013

(65) Prior Publication Data

US 2013/0123406 A1 May 16, 2013

Related U.S. Application Data

(62) Division of application No. 12/220,748, filed on Jul. 28, 2008, now Pat. No. 8,366,866.

(51) Int. Cl.
| | |
|---|---|
| C04B 37/00 | (2006.01) |
| B05D 3/02 | (2006.01) |
| C08K 5/17 | (2006.01) |
| C08G 63/02 | (2006.01) |
| C09J 5/02 | (2006.01) |
| C09J 1/00 | (2006.01) |
| C08G 67/04 | (2006.01) |
| C09J 129/00 | (2006.01) |
| C08L 67/06 | (2006.01) |
| C09J 135/00 | (2006.01) |
| C08L 33/08 | (2006.01) |
| C08K 3/20 | (2006.01) |

(52) U.S. Cl.
CPC . *C08K 5/17* (2013.01); *C08G 63/02* (2013.01); *C09J 5/02* (2013.01); *C09J 1/00* (2013.01); *C08G 67/04* (2013.01); *C04B 37/005* (2013.01); *C09J 129/00* (2013.01); *C08L 67/06* (2013.01); *C09J 135/00* (2013.01); *C08L 33/08* (2013.01); *C08K 3/20* (2013.01)
USPC .............. 156/325; 427/372.2; 427/383.1; 427/384

(58) Field of Classification Search
USPC .............. 156/325; 427/372.2, 383.1, 384
See application file for complete search history.

(56) References Cited

U.S. PATENT DOCUMENTS

| | | |
|---|---|---|
| 5,318,990 A | 6/1994 | Strauss |
| 5,412,026 A | 5/1995 | Holy et al. |
| 5,763,524 A | 6/1998 | Arkens et al. |
| 5,932,665 A | 8/1999 | DePorter et al. |
| 6,221,973 B1 | 4/2001 | Arkens et al. |
| 6,699,945 B1 | 3/2004 | Chen et al. |
| 7,321,010 B2 | 1/2008 | Shooshtari et al. |
| 2007/0292619 A1 | 12/2007 | Srinivasan et al. |

*Primary Examiner* — Michael Orlando
(74) *Attorney, Agent, or Firm* — Robert D. Touslee

(57) ABSTRACT

Compositions for binding organic or inorganic fibers is described. The compositions may include an aqueous solution having a pH of about 4.5 or more. The aqueous solution may include a polycarboxy polymer that is about 10%, by wt., to 100%, by wt., of a butenedioic acid or butenedioic anhydride; and a polyol. The compositions can maintain a pH of about 5 or more after being cured into a thermoset plastic with the fibers. Processes for preparing a binder composition for organic or inorganic fibers are also described. The processes may include providing an aqueous solution of polycarboxylic acid polymers, where the polymers comprise about 10%, by wt., to 100%, by wt., of a butenedioic acid or butenedioic anhydride; adding a polyol to the aqueous solution; and maintaining the pH of the aqueous solution at about 5 or more.

10 Claims, No Drawings

FORMALDEHYDE FREE BINDER COMPOSITIONS FOR FIBROUS MATERIALS

FIELD OF THE INVENTION

This application is a division of application Ser. No. 12/220,748, filed Jul. 28, 2008, now U.S. Pat. No. 8,366,866 issued Feb. 5, 2013. Binding compositions are described for use with fibers. More specifically, the subject invention pertains to a curable binder composition that can be prepared at a pH greater than 4. The binder compositions can replace formaldehyde-based binders in fiber containing products.

BACKGROUND OF THE INVENTION

Binder compositions for fiber containing products have a variety of uses that include stiffening applications where the binder is used to stiffen a fiber containing product; thermoforming applications wherein the binder resin is applied to a sheet or lofty fibrous product, following which it is dried and optionally B-staged to form an intermediate and still curable product; and forming fully cured systems such as building insulation.

One important application of binder compositions is to form fibrous glass into insulation. Fiberglass insulation generally includes matted glass fibers bonded together by a cured thermoset polymeric material. Molten streams of glass are drawn into fibers of random lengths and blown into a forming chamber where they are randomly deposited as a mat onto a traveling conveyor. The glass fibers, while in transit in the forming chamber and still hot from the drawing operation, are sprayed with an aqueous binder composition. The residual heat from the glass fibers and the flow of air through the fibrous mat during the forming operation are generally sufficient to volatilize water from the binder, thereby leaving the remaining components of the binder on the fibers as a viscous or semi-viscous high solids liquid. The coated fibrous mat is transferred to a curing oven where heated air is blown through the mat to cure the binder and rigidly bond the glass fibers.

Conventional binder compositions for fiberglass include phenol-formaldehyde binders, which are favored for their low cost and the ability to go from a low viscosity liquid in the uncured state to a rigid thermoset polymer when cured. A low viscosity uncured binder allows the mats to be properly sized. In contrast, viscous binders are usually sticky and promote fiber accumulation on surfaces of the production equipment. Some of this accumulated fiber inevitably falls on the mat, causing dense areas and defects in the fiberglass. After the binder composition is applied and cured, however, it should be transformed from a low viscosity liquid to a rigid matrix. This allows the fiberglass insulation to spring from a compressed volume when packaged, back to its uncompressed full size when installed.

Numerous thermosetting polymers can go from low viscosity liquids to rigid polymer matrices when cured. However, binder-coated fiberglass is typically viewed as a commodity, and subject to intense cost pressures. The economics rule out the use of most thermosetting polymer resins, including many polyurethanes and epoxies, among other resins. The success of phenol-formaldehyde resins is due in part to their excellent cost/performance ratio. Phenol-formaldehyde resins can be economically produced, and can be extended with urea prior to use as a binder in many applications. Such urea-extended phenol-formaldehyde binders have been the mainstay of the fiberglass insulation industry for years.

More recently, concerns about emissions of volatile organic compound (VOCs) and other environmental contaminants have provided an impetus to reduce the use of formaldehyde-based binders. Fiberglass producers have experimented with changes in the ratio of phenol to formaldehyde in the phenol-formaldehyde resole resins, as well as changes in catalysts, and the addition of formaldehyde scavengers. While these changes have resulted in considerable improvement in emissions from the binders, increasingly stringent government regulations have encouraged producers to formulate binders that are essentially formaldehyde free.

One alternative binder formulation replaces the phenol-formaldehyde with polycarboxy polymers. While the polycarboxy binders are cost competitive with phenol-formaldehyde from a materials standpoint, they can be tough on manufacturing equipment. The polycarboxy binders are made under very acidic conditions, typically starting with aqueous solutions of acrylate and/or methacrylate monomers (e.g., acrylic acid and/or methacrylic acid) that have a pH of about 2 to 4. Production equipment that comes in contact with these solutions often requires repair and replacement at an accelerated pace due to the highly acidic environment. Thus, there is a need for binder compositions and method of making them that does not require such highly acidic conditions. These and other problems are addressed here.

BRIEF SUMMARY OF THE INVENTION

Binder compositions and methods of making them are described where the pH of the pre-cured binder solution and the cured binder product have a pH higher than conventional polycarboxy binder formulations. The present binder solutions may be made and cured at pHs of about 4.5 or more (e.g., about 4.5 to about 9). These higher pHs may also extend to the cured binder and fiber products, which may have a pH of about 4.5 or more, 5 or more, etc.

These higher pH binder compositions are more tolerated by processing equipment that comes in contact with the binder solutions. It also allows the binders to be used with equipment made from less acid resistant materials, which can reduce equipment costs. The higher pH of the cured products (e.g., fiberglass mat) is also more compatible with acid sensitive building materials like metal beams and fasteners.

Embodiments of the invention include compositions for binding organic or inorganic fibers. The compositions may include an aqueous solution having a pH of about 4.5 or more. The aqueous solution may include a polycarboxy polymer that is about 10%, by wt., to 100%, by wt., of a butenedioic acid or butenedioic anhydride; a polyol; and optionally a cross-linking catalyst. The compositions can maintain a pH of about 5 or more after being cured into a thermoset plastic with the fibers.

Embodiments of the invention also include processes for preparing a binder composition for organic or inorganic fibers. The processes may include the step of providing an aqueous solution of polycarboxylic acid polymers, where the polymers comprise about 10%, by wt., to 100%, by wt., of a butenedioic acid or butenedioic anhydride. The processes may also include the steps of adding a polyol, and optionally a cross-linking catalyst, to the aqueous solution; and maintaining the pH of the aqueous solution at about 5 or more.

Embodiments of the invention may still also include processes for binding organic or inorganic fibers. The processes may include the step of applying a binder composition on the fibers. The binder composition may have a pH of about 4.5 or more, and may include a polycarboxy polymer that is about 10%, by wt., to 100%, by wt., of a butenedioic acid, a polyol, and optionally a cross-linking catalyst. The processes may also include the step of curing the binder composition to form an article comprising a thermoset plastic and the fibers.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

DETAILED DESCRIPTION OF THE INVENTION

Polycarboxy binder compositions are described that can efficiently form a crosslinked binder polymers at pHs of about 4.5 or more. The binder compositions include a polycarboxylic acid that may be made partially or exclusive from a butenedioic acid or butenedioic anhydride. The compositions also include a crosslinking compounds that react with the polycarboxylic acid (with or without the presence of a crosslinking catalyst) at a curing temperature and pH of about 4.5 or more, to form a rigid thermoset polymer.

The polycarboxy binders in the uncured state have low viscosity making them easy to apply to fibers. When the mixture of binder composition and fibers are cured, a fiber reinforced polymer is formed. These fiber reinforced binders have a variety of applications, including fiberglass insulation.

The binder polymers may include polycarboxylic acids that in the cured state are crosslinked with one or more crosslinking compound. The polycarboxylic acids may be synthesized via a reaction of ethylenically unsaturated monomers that contain carboxylic acids and/or acid anhydrides. They may also be formed from the condensation of monomers containing multifunctional carboxylic acids and/or acid anhydrides that leave unreacted carboxylic acid moieties. When monomer or polymer units contain multiple anhydride moieties, they may be converted to polycarboxylic acid moieties by hydrolysis with water.

Examples of carboxylic acids that may be used to make the polycarboxy acids may include saturated or unsaturated organic acids that may have one or more carboxylic acid moieties. Specific examples include acrylic acid, methacrylic acid, a butenedioic acid (i.e., maleic acid and/or fumaric acid), among other carboxylic acids. Examples of acid anhydrides that may be used to make the polycarboxylic acids include saturated or unsaturated anhydrides that have one or more anhydride moieties. Specific examples include acrylic anhydrides, methacrylic anhydrides, itaconic anhydrides, and butenedioic anhydrides (e.g., maleic anhydride), among other anhydrides.

The polycarboxylic acids may also include copolymers of carboxylic acids and/or anhydrides, and ethylenically unsaturated monomers that do not contain a carboxylic acid or anhydride moiety. Examples of these co-monomer groups include ethylene, propylene, styrene, butadiene, acrylamide, acrylonitrile, and (meth)acrylate esters, among other groups.

The polycarboxylic acids may contain from about 10% to about 100%, by wt., butenedioic acid and/or butenedioic anhydride. When the polycarboxylic acid is made from less than 100% butenedioic acid and/or butenedioic anhydride, other carboxylic acids, carboxylic anhydrides, and/or ethylenically unsaturated monomers may make up the rest of the polycarboxylic acid.

When the polycarboxylic acid contains free carboxylic anhydride moieties, a hydrolysis step may be performed to convert the anhydrides into carboxylic acid moieties. In some embodiments, a catalyst may be added to facilitate the hydrolysis. For example and alkaline catalyst such as alkali metal hydroxides, alkali earth metal hydroxides, tertiary amines, ammonium hydroxide, among other alkaline compounds may be added to the aqueous solution to help catalyze the hydrolysis. For example, styrene-maleic anhydride (SMA) may undergo a alkaline catalyzed hydrolysis in water to form a styrene-maleic acid polycarboxylic acid.

The binder compositions may also include one or more crosslinking compounds that react with the polycarboxylic acids to form crosslinked polymers. Typically, these compounds contain one or more moieties that react with carboxylic acid functional groups of mono- or polycarboxy compounds to form a covalent bonds. Classes of these crosslinking compounds may include polyols (i.e., alcohols with a plurality of hydroxyl groups) such as polyester polyols, polyether polyols, acrylic polyols, glycols, alkanol amines, amines, diamines, polyamines, epoxies, carbodiimides, aziridines, and other types of compounds with functional groups that promote crosslinking of the binder polymers. Specific glycols may include ethylene glycol, propylene glycol, glycerol, diethylene glycol, and triethylene glycol, among other glycols. Specific alkanol amines may include ethanol amine, diethanol amine, and triethanol amine, among other alkanol amines. Specific polyamines may include ethylene diamine, hexane diamine, and triethylene diamine, among other polyamines. Specific epoxies may include bisphenol-A based epoxies, aliphatic epoxies, and epoxidized oils, among other epoxy compounds.

The present binder compositions may be applied to a variety of fibers. These fibers may include organic and/or inorganic fibers. Organic fibers may include fibers made from organic polymers such as polyamide fibers, polypropylene fibers, polyester fibers, and/or polyaramide fibers, among other organic polymer fibers. Inorganic fibers may include glass fibers (e.g., silicon oxide), ceramic fibers (e.g., silicon carbide), basalt, inorganic carbon, metals, and metal oxides, among other materials. The fibers may be arranged as a woven mat or textile, or a non-woven mat or bulk.

The binder compositions may be applied as a flowable liquid to the fibers. Typically the compositions are aqueous solutions, but embodiments may also include organic solutions where the binder polymer are dissolved in an organic solvent, emulsions of the binder in water, and neat liquids of undissolved binder polymers.

In addition to the binder polymers, the binder compositions may also optionally include one or more cross-linking catalysts (sometimes called accelerators) that promote the polymerization of polycarboxylic acids and crosslinking compounds like the polyols. Cross-linking catalysts may include phosphorous-containing compounds such as phosphorous oxyacids and their salts. For example, the cross-linking catalyst may be an alkali metal hypophosphite salt like sodium hypophosphite (SHP).

The binder compositions may also optionally include an initiator such as benzophenone, azoisobutyronitrile, cumyl hydroperoxide, benzoyl peroxide, and/or catalysts such as triethyl amine, and cobalt octanoate. These compounds may be added to expedite curing of the binder composition on glass fibers.

The binder compositions may also include an organic or inorganic extender. Specific examples of extenders include starch, lignin, rosin, polymers, and clays, among other extenders.

In addition the binder compositions may include adhesion promoters, oxygen scavengers, solvents, emulsifiers, pigments, fillers, anti-migration aids, coalescents, wetting agents, biocides, plasticizers, organosilanes, anti-foaming agents, colorants, waxes, suspending agents, anti-oxidants, secondary crosslinkers, as well as combinations of these types of compounds.

As noted above, the binder compositions may be coated on a variety of fibers. Specific applications include coating the compositions on glass fibers to make fiberglass insulation. When the fiberglass is a microglass-based substrate, the binder may be applied and cured to form printed circuit boards, battery separators, filter stock, and reinforcement scrim, among other articles.

The binder compositions can be coated on fibers using a variety of techniques. For example, the binder compositions may be spray coated, spin-curtain coated, or dipping-roll coated, among other techniques. The composition may be applied to freshly-formed fiberglass, or to fiberglass following collection.

After application of the low-viscosity fiber composition on the fibers, the amalgam may undergo curing, wherein the binder polymers undergo further chemical reaction to form a thermoset plastic coating. In some embodiments curing is conducted at ambient temperature, and in other embodiments the curing is conducted at elevated temperature (e.g., up to 300° C.) to expedite the formation of a stable and secure polymer coating. The peak curing temperature may depend in part on the component of the binder composition, such as whether a curing catalyst is present.

The cured binder at the conclusion of the curing step is typically present as a secure thermoset polymer coating that may represent about 0.5% to about 50%, by wt. (e.g., about 1% to about 10%, by wt.) of the fiber reinforced article.

The polycarboxy binder compositions provide a formaldehyde-free way to make formaldehyde-free fiber reinforced products. They also provide advantageous flow properties, and offer the possibility of lower binder usage, lower overall energy consumption, decreased water usage, and less wear on production equipment. These improvements and others result in more cost effective ways of producing fiber reinforced products.

EXPERIMENTAL

Experiment #1

An aqueous solution of Styrene-Maleic Anhydride (SMA) was hydrolyzed to form Styrene-Maleic Acid. In a flask equipped with a reflux condenser, 6.68 g of sodium hydroxide (NaOH) was added to 250 g of water. To this solution, 160 g of SMA was added and stirred until partially dissolved. The solution was heated to 90° C. for several hours to produce a clear solution of SMAcid at 40% solid level. The molar ratio of SMA:NaOH was 4:1 resulting in a polymer with an acid:salt ratio of 7:1. The acid equivalent of the resin was 142.9 g/mol.

To 35.75 g or the resin solution was added 5.0 g of triethanol amine (TEA). In some test runs 0.39 g of sodium hypophosphite (SHP) as an accelerator at 2%, by wt, while in other test runs no accelerator was added to the formulation. The mixture was stirred until uniform. The Acid:OH ratio of the resulting resin was 1:1. DMA indicated the resin cured at below 200° C. to form a rigid polymer. The viscosity of the 41.7% solid solution was 3,600 cps an the pH of the resin was 4.5, both before and after the addition of the SHP. The resin cured on fiberglass at 6-25% resin level at 200° C. for those formulations without SHP, and 180° C. for formulations that included the SHP accelerator. All samples were white, rigid and highly water resistant.

Experiment #2

The experimental setup of Example #1 was repeated except for substituting 6.66 g of diethanol amine (DEA) for the TEA. Following the cure of the binder composition, the resin produced a white, rigid and highly water resistant bat.

Experiment #3

The experimental setup of Example #1 was repeated except the amount of TEA used was increased to 8.33 g. Following the cure of the binder composition, the resin produced a white, rigid and highly water resistant bat.

Experiment #4

The experimental setup of Example #1 was repeated except the amount of TEA used was increased to 10 g. Following the cure of the binder composition, the resin produced a white, rigid and highly water resistant bat.

Experiment #5

The experimental setup of Example #1 was repeated except for substituting 7.0 g of Michael adducts of DEA/acrylic acid (2:1 mol:mol) for the TEA. Following the cure of the binder composition, the resin produced a white, rigid and highly water resistant bat.

Experiments #6-8 used an ammonium hydroxide ($NH_4OH$) solution to reduce the viscosity of the resin.

Experiment #6

The experimental setup of Example #1 was repeated except for adding 1%, by wt., of a 28% solution of $NH_4OH$. Viscosity of the 41.7% solid solution was reduced to 1,440 cps and the pH of the resin increased to 5.5 both before and after the addition of the SHP. Following the cure of the binder composition, the resin produced a white, rigid and highly water resistant bat.

Experiment #7

The experimental setup of Example #1 was repeated except for adding 2%, by wt., of a 28% solution of $NH_4OH$. Viscosity of the 41.7% solid solution was reduced to 511 cps and the pH of the resin increased to 6.5, both before and after the addition of the SHP. Following the cure of the binder composition, the resin produced a white, rigid and highly water resistant bat.

Experiment #8

The experimental setup of Example #1 was repeated except for adding 3%, by wt., of a 28% solution of $NH_4OH$. Viscosity of the 41.7% solid solution was reduced to 286 cps and the pH of the resin increased to 7.5, both before and after the addition of the SHP. Following the cure of the binder composition, the resin produced a white, rigid and highly water resistant bat.

Experiment #9

5.0 g of TEA is dissolved in 16.8 g or water. Then 11.8 g of poly-maleic acid is added and stirred at ambient temperature until it is fully dissolved. Under cure conditions (including with and without SHP addition) of Example #1, the resin produced is a white and rigid water resistant bat.

Corrosion Resistance Measurements:

Resin solutions of Examples #1, 6, 7, and 8 were evaluated for their ability to corrode steel. The corrosion tests included providing standard pre-weighted steel corrosion coupons in a 10% aqueous binder solution. The binder was stirred for 24 hours at 25° C. Then the coupons were rinsed with deionized water, dried, and weighed. The levels of iron leached into the resin from the steel coupons was also measured. The test results showed that four resins made according to Examples #1, 6, 7, and 8 had lower corrosion rates than a conventional resin made from polyacrylic acid and TEA.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the catalyst" includes reference to one or more catalysts and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A process for preparing a binder composition for organic or inorganic fibers, the process comprising:
    providing an aqueous solution of polycarboxylic acid polymers, wherein the polymers comprise about 10%, by wt., to 100%, by wt., of a butenedioic anhydride;
    adding a basic compound to the aqueous solution, wherein the basic compound is selected from a group consisting of an alkali metal hydroxide and an alkali earth metal hydroxide;
    hydrolyzing the butenedioic anhydride with the basic compound to form a butenedioic acid, wherein the basic compound is a catalyst for hydrolyzing the butenedioic anhydride;
    adding a polyol to the aqueous solution; and
    maintaining the pH of the aqueous solution at about 5 or more.

2. The process of claim 1, wherein the process further comprises adding a cross-linking catalyst to the aqueous solution.

3. The process of claim 1, wherein the butenedioic acid comprises maleic acid or fumaric acid, and the butenedioic anhydride comprises maleic anhydride.

4. The process of claim 1, wherein the polycarboxylic acid polymers are copolymers of maleic acid or maleic anhydride and a second unit selected from the group consisting of acrylic acid, acrylic anhydride, methacrylic acid, methacrylic anhydride, ethylene, propylene, acrylamide, acrylonitrile, (meth)acrylate, fumaric acid, and styrene.

5. The process of claim 1, wherein the polyol is selected from the group consisting of ethylene glycol, propylene glycol, a polyether polyol, di-ethylene glycol, triethylene glycol, ethanol amine, diethanol amine, triethanol amine, a polyester polyol, a polyether polyol, an acrylic polyol, ethylene diamine, hexane diamine, triethylene diamine, an aromatic epoxy, an aliphatic epoxy, and an epoxidized oil.

6. The process of claim 2, wherein the cross-linking catalyst comprises sodium hypophosphite.

7. The process of claim 1, wherein the pH of the aqueous solution is maintained in a range from about 5 to about 9.

8. The process of claim 1, wherein maintaining the pH of the aqueous solution comprises adding a hydroxide base to the solution.

9. The process of claim 8, wherein the hydroxide base is sodium hydroxide.

10. The process of claim 1, wherein the process further comprises adding ammonium hydroxide to the aqueous solution.

* * * * *